(12) United States Patent
Vlasov et al.

(10) Patent No.: US 11,431,629 B2
(45) Date of Patent: Aug. 30, 2022

(54) DATA PACKET MANAGEMENT

(71) Applicant: Micron Technology, Inc., Boise, ID (US)

(72) Inventors: Aleksei Vlasov, Austin, TX (US); Prateek Sharma, San Jose, CA (US); Yoav Weinberg, Thornhill (CA); Scheheresade Virani, Frisco, TX (US); Bridget L. Mallak, Forest Lake, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/991,376

(22) Filed: Aug. 12, 2020

(65) Prior Publication Data

US 2022/0052948 A1    Feb. 17, 2022

(51) Int. Cl.
*H04L 45/74* (2022.01)
*H04L 45/30* (2022.01)

(52) U.S. Cl.
CPC .............. *H04L 45/74* (2013.01); *H04L 45/30* (2013.01)

(58) Field of Classification Search
CPC ..... H04L 67/1097; H04L 45/00; H04L 45/22; H04L 45/28; H04L 45/586; G06T 1/60; G09G 2360/12; G09G 2360/127
See application file for complete search history.

(56) References Cited

U.S. PATENT DOCUMENTS

| | | | |
|---|---|---|---|
| 7,864,758 B1 * | 1/2011 | Lolayekar | H04L 67/1097 370/389 |
| 8,381,033 B2 | 2/2013 | Franklin | |
| 10,148,523 B1 * | 12/2018 | Evans | H04L 41/0886 |
| 2003/0002503 A1 * | 1/2003 | Brewer | H04L 47/10 370/392 |
| 2005/0050336 A1 * | 3/2005 | Liang | H04L 63/0218 713/188 |
| 2011/0169848 A1 * | 7/2011 | Bratt | G09G 5/363 345/545 |
| 2011/0228669 A1 * | 9/2011 | Lei | H04L 45/586 370/219 |
| 2016/0170848 A1 | 6/2016 | Yang et al. | |

* cited by examiner

*Primary Examiner* — Mansour Oveissi
(74) *Attorney, Agent, or Firm* — Brooks, Cameron & Huebsch, PLLC (57) ABSTRACT

A system includes a storage system and circuitry coupled to the storage system. The circuitry is configured to perform operations comprising determining a type of a received data packet, determining a destination of the received data packet, and determining whether the received data packet is of a particular type or has a particular destination. The operations further comprise, responsive to determining that the received data packet is of the particular type or has the particular destination, rerouting the received data packet from the particular destination to a register of the storage system.

16 Claims, 4 Drawing Sheets

DATA PACKET MANAGEMENT

TECHNICAL FIELD

Embodiments of the disclosure relate generally to storage systems, and more specifically, relate to data packet management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to data packet management associated with a storage system. An example of a storage system is a solid-state drive (SSD). An SSD can include multiple interface connections to one or more host systems. The interface connections can be referred to as ports. A host system can send data commands to the SSD via a port of the SSD. The SSD can include a peripheral component interconnect express (PCIe) interface. Data packet management can be associated with a protocol layer, such as a PCIe protocol layer. However, embodiments of the present disclosure are not limited to data packet management associated with a PCIe protocol layer. Examples of commands associated with a PCIe protocol layer include, but are not limited to, memory read (MemRd) and memory write (MemWr).

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation of a storage system, communication of data packets from the storage system may be blocked or ceased. However, blocking or ceasing communication of data packets from the storage system may not render the storage system unresponsive. For example, messages, configuration reads, and/or configuration writes can be communicated to and/or from the storage system while communication of data packets from the storage system are blocked or ceased. Communication of data packets may be managed by a processing device (e.g., a controller) of the storage system. However, in a multi-function or multi-port storage system, management of communication of data packets may be complex. A storage system, such as an SSD, can be capable of pipelined command execution in which multiple data commands, received from one or more hosts, are executed, in parallel, on the SSD. Changes in the states of hosts can affect performance of the SSD. For example, a storage system may include a plurality of controllers. Resources of a storage system, such as a storage system controller, a direct memory access (DMA) controller, and/or local memory, may be shared amongst functions of the storage system. For example, if a port associated with a first function of a storage system is reset, which may initiated by a host coupled to the port, then a controller shared by the first function and a second function of the storage system will be unavailable to the second function indefinitely. This may cause transactions or commands associated with the second function to not be processed during the reset and lead to a backup of undeliverable data packets from the storage system.

Resets of an interface (e.g., a port) of a storage system may be a functional operation rather than a hardware reset. Logic of the interface may be selectively cleared or idled instead of controlled by a reset port of the storage system. Hardware of a storage system may continue to process outstanding transactions or commands to completion during a reset condition of a port of the storage system. For instance, when a host system issues a reset of a port of a storage system, for example, the host system no longer expects to receive data packets from the storage system via the port associated with transactions initiated prior to the reset. However, there may be outstanding transactions (e.g., initiated prior to the reset) associated with the port. The storage system may process outstanding transactions associated with the port to complete the reset of the port. A reset can include a "handshake" between a host system and a storage system for completion of the reset. A timing constraint can be applied to the handshake. The difference in the amount of time for a host to exit a reset condition and the amount of time for a storage system to exit the reset condition may cause timing issues. However, the storage system may not process a transaction associated with the command until after the second amount of time, until the outstanding transactions have been processed to completion. This may result in a backup of undeliverable commands from the host system to the storage system.

If the storage system is a resource of a virtual machine (VM), the VM may not be assigned other resources (e.g., other storage systems) until the outstanding transactions have been processed. If a VM fails, that VM may be reset. Outgoing commands (e.g., commands directed to a host) from one or more resources assigned to that VM may have increased latency or be undeliverable until the resources are reset. The increased latency of outgoing commands and/or undeliverable outgoing commands may cause other VMs assigned those same resources to fail as well and/or commands directed to other VMs to fail. VMs can be unaware of each other. Although VMs may not be fully unaware of one another, the latency impact (e.g., quality of service (QoS)) for other VMs can be minimized when another one of the VMs is being reset.

Figure 1:
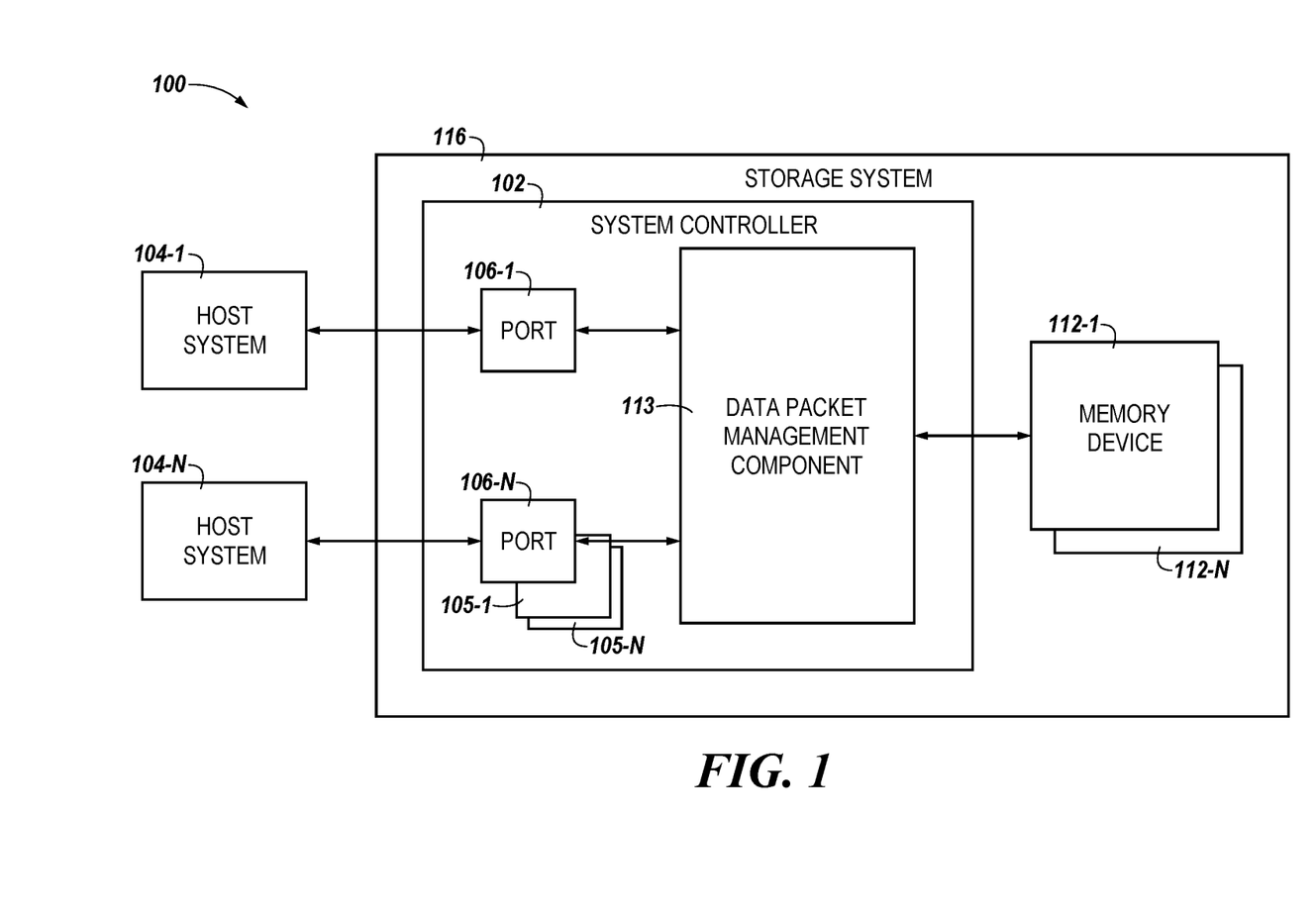
FIG. 1 illustrates an example computing system that includes a storage system in accordance with some embodiments of the present disclosure.

Aspects of the present disclosure address the above and other deficiencies by, in particular situations, preventing communication of data packets from a storage system while allowing the storage system to process transactions and/or commands that generated the data packets. For instance, it can be beneficial to allow data transfers associated with outstanding transactions to become quiescent before a reset condition is exited. By blocking communication of the data packets, a storage system can process outstanding transactions, even if processing of the outstanding transactions is not completed until after a host system has completed a reset. Because the host system does not receive any data packets resulting from processing of the outstanding transactions, from the point of view of the host system the storage system has completed the reset sooner. The data packet management described herein enables the timing/complexity constraint on a handshake between a host system and a storage system for completion of a reset to be relaxed, or even removed. At least one embodiment of the present disclosure includes the handshake occurring during data packet management (e.g., the data packet management component 113 described in association with FIG. 1 is active). The data packet management prevents further communication of data packets (e.g., "data leaks") from the storage system so that has the time to complete or quiesce internal requests of the storage system.

In at least one embodiment of the present disclosure can include, in response to a VM being reset, processing outstanding transactions on a storage system assigned to the VM without communicating data packets from processing the outstanding transactions from the storage system. For example, communication of the data packets from the storage system to a host can be blocked. As a result, the VM can be reset while the storage system can receive and process other commands so that other VMs are unaware the reset of the VM.

Embodiments of the present disclosure can enable outstanding transactions or commands to be processed to completion by a storage system without communicating data packets generated from processing the outstanding transactions or commands from the storage system. Embodiments of the present disclosure can enable outstanding transactions associated with a particular function or port of a storage system to be processed by the storage system without communicating data packets associated with outstanding transactions from the storage system. Embodiments of the present disclosure can enable data paths of a storage system to be freed up naturally by allowing outstanding transactions and commands to be processed to completion. Embodiments of the present disclosure can block communication of data packets associated with different functions of a storage system asynchronously. Embodiments of the present disclosure can enable modules of a storage system that are performing operations, such as performing transactions, computations, and/or other processes, not directly related to a PCIe protocol can continue performing those operations without using a "recovery/error handling" data path. In at least one embodiment, data packets generated from processing outstanding transactions or commands can be stored, at least temporarily, in a local memory of a storage system instead of communicating the data packets from the memory sub-system can be referred to as "bit bucketing." Local memory used for bit bucketing can receive ("consume") data packets in a similar manner as a host system. As a result, behaviors of lower level modules of a storage system, in firmware or hardware, is not affected by a reset of an interface of the storage system.

In at least one embodiment, a storage system can include circuitry (e.g., hardware logic) configured to determine a destination of a data packet. A non-limiting example of a destination of a data packet can be a host system coupled to the storage system. The circuitry can be configured to determine a type of a data packet. Based on the determined destination and/or the determined type of a data packet, communication of the data packet from the storage system can be blocked. For example, a data packet may be rerouted from communication via an interface of the storage system to a local memory component of the storage system to block communication of the data packet from the storage system. In at least one embodiment, data packets can be dropped at the host-most end of a data path, after a processing device of a storage system has consumed, processed, and/or transferred data corresponding to the data packets internally. As used herein, "dropping a data packet" refers to communicating with the host systems 104 (e.g., clients), and any intermediate blocks, as if the transaction or command associated with the data packet has been completed.

FIG. 1 illustrates an example computing system 100 that includes a storage device, in accordance with some embodiments of the present disclosure. An example of a storage system 116 is an SSD. The computing system 100 can include one or more host systems (e.g., the host system 104-1, . . . , the host system 104-N). The host system 104-1, . . . , the host system 104-N can be referred to collectively as the host systems 104. The host systems 104 can be a computing device such as a desktop computer, laptop computer, network server, mobile device, or such computing device that includes a memory and a processing device. The host systems 104 can include or be coupled to the storage system 116. The host systems 104 can write data to the storage system 116 and/or read data from the storage system 116. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The storage system 116 can include memory devices 112-1 to 112-N (referred to collectively as the memory devices 112). The memory devices 112 can include any combination of the different types of non-volatile memory devices and/or volatile memory devices. Some examples of volatile memory devices include, but are not limited to, random access memory (RAM), such as dynamic random access memory (DRAM) and synchronous dynamic random access memory (SDRAM). Some examples of non-volatile memory devices include, but are not limited to, negative-and (NAND) type flash memory and write-in-place memory, such as a three-dimensional cross-point ("3D cross-point") memory device. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 112 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 112 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 112 can be grouped as pages that can refer to a logical unit of the memory device used to store data. With some types of memory (e.g., NAND), pages can be grouped to form blocks.

Although non-volatile memory components such as 3D cross-point are described, the memory device 112 can be based on any other type of non-volatile memory or storage device, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

The host systems 104 can be coupled to the storage system 116 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a dual in-line memory module (DIMM) interface (e.g., DIMM socket interface that supports Double Data Rate (DDR)), etc. The physical host interface can be used to transmit data between the host systems 104 and the storage system 116. The host systems 104 can further utilize an NVM Express (NVMe) interface to access the memory devices 112 when the storage system 116 is coupled with the host systems 104 by the PCIe interface. The physical host interface can provide an interface for passing control, address, data, and other signals between the storage system 116 and the host systems 104.

The host systems 104 can send one or more commands (e.g., read, write, erase, program, etc.) to the storage system 116 via one or more ports (e.g., the port 106-1, . . . , the port 106-N) of the storage system 116. The port 106-1, . . . , the port 106-N can be referred to collectively as the ports 106. As used herein, a "port" may be a physical port or a virtual port. A physical port can be a port configured to send and/or receive data via a physical function. A virtual port can be a port configured to send and/or receive data via a virtual function (VF). The ports 106 of the storage device 116 can communicatively couple the storage system 116 to the host systems 104 via a communication link (e.g., a cable, bus, etc.) to establish a respective command path to a respective one of the host systems 104.

The storage system 116 can be capable of pipelined command execution in which multiple commands are executed, in parallel, on the storage system 116. The storage system 116 can have multiple command paths to the memory devices 112. For example, the storage system 116 can be a multi-channel and/or multi-function storage device that includes multiple physical PCIe paths to the memory devices 112. In another example, the storage system 116 can use single root input/output virtualization (SR-IOV) with multiple VFs that act as multiple logical paths to the memory devices 112.

SR-IOV is a specification that enables the efficient sharing of PCIe devices among virtual machines. A single physical PCIe can be shared on a virtual environment using the SR-IOV specification. For example, the storage system 116 can be a PCIe device that is SR-IOV-enabled and can appear as multiple, separate physical devices, each with its own PCIe configuration space. With SR-IOV, a single I/O resource, which is referred to as a physical function, can be shared by many VMs. An SR-IOV virtual function is a PCI function that is associated with an SR-IOV physical function. A VF is a lightweight PCIe function that shares one or more physical resources with the physical function and with other VFs that are associated with that physical function. Each SR-IOV device can have a physical function and each physical function can have one or more VFs associated with it. The VFs are created by the physical function.

In some embodiments, the storage system 116 includes multiple physical paths and/or multiple VFs that provide access to a same storage medium (e.g., one or more of the memory devices 112) of the storage system 116. In some embodiments, at least one of the ports 106 can be PCIe ports.

In some embodiments, the computing system 100 supports SR-IOV via one or more of the ports 106. In some embodiments, the ports 106 are physical ports configured to transfer data via a physical function (e.g., a PCIe physical function). In some embodiments, the storage system 116 can include virtual ports 105-1, . . . , 105-N (referred to collectively as the virtual ports 105. The virtual ports 105 can be configured to transfer data via a VF (e.g., a PCIe VF). For instance, a single physical PCIe function (e.g., the port 106-N) can be virtualized to support multiple virtual components (e.g., virtual ports such as the virtual ports 105) that can send and/or receive data via respective VFs (e.g., over one or more physical channels which may each be associated with one or more VFs).

The storage system 116 can be configured to support multiple connections to, for example, allow for multiple hosts (e.g., the host systems 104) to be connected to the storage system 116. As an example, in some embodiments, the computing system 100 can be deployed in environments in which one or more of the host systems 104 are located in geophysically disparate locations, such as in a software defined data center deployment. For example, the host system 104-1 can be in one physical location (e.g., in a first geophysical region), the host system 104-N can be in a second physical location (e.g., in a second geophysical region), and/or the storage system 116 can be in a third physical location (e.g., in a third geophysical region).

The storage system 116 can include a system controller 102 to communicate with the memory devices 112 to perform operations such as reading data, writing data, or erasing data at the memory devices 112 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor. In general, the system controller 102 can receive commands or operations from any one of the host systems 104 and can convert the commands or operations into instructions or appropriate commands to achieve the desired access to the memory devices 112. The system controller 102 can be responsible for other operations such as wear leveling operations, garbage collection operations, error detection and error-correcting code (ECC) operations, encryption operations, caching operations, and address translations between a logical block address and a physical block address that are associated with the memory devices 112.

The system controller 102 can include a data packet management component 113. The data packet management component 113 can be configured to determine a type of a data packet received by the data packet management component 113. For example, the data packet management component 113 can snoop a header of the data packet to determine a function of the storage system 116 that is a source of the data packet. The data packet management component 113 can be configured to determine a destination of a data packet received by the data packet management component 113. For example, the data packet management component 113 can snoop a header of the data packet to determine the destination of the data packet. A non-limiting example of a destination of a data packet can be one or more of the host systems 104.

The data packet management component 113 can be configured to determine whether the received data packet is of a particular type or has a particular destination. For example, the data packet management component 113 can determine whether a data packet is associated with a read transaction, a write transaction, or a completion transaction. For example, the data packet management component 113 can determine whether a data packet is destined one or more of the host systems 104. The data packet management component 113 can be configured to, responsive to determining that the received data packet is of the particular type or has the particular destination, reroute the received data packet from the particular destination to a register of the storage system 116. In at least one embodiment, the register can be a component of the local memory of the system controller 102. A data packet determined by the data packet management component 113 to be destined for one or more of the host systems 104 can be rerouted from that host system to the local memory. In at least one embodiment, a data packet determined by the data packet management component 113 to be destined for the host system 120 can be dropped.

In at least one embodiment, the data packet management component 113 can be configured to block communication of a data packet of a first type and configured to permit communication of a data packet of a second type. For example, data packets associated with completion transactions (e.g., completion transaction layer packets (completion TLPs)) and/or message transactions (message TLPs) can be permitted to be communicated to one or more of the host systems 104 so that reads of registers of the memory subsystem controller 115 to be completed. Permitting communication of a completion TLP can prevent hang conditions of a component, or element, of the computing system 100 that may be waiting for the completion TLP. The data packet management component 113 can be configured to, responsive to determining that the received data packet is associated with the completion transaction, permit communication of the received data packet to the particular destination.

Communication of data packets associated with a read transaction (e.g., a read TLP) or a write transaction (e.g., a write TLP) can be blocked. For example, write TLPs and/or read TLPs associated with a function of the storage system 116 being reset can be blocked. The data packet management component 113 can be configured to, responsive to determining that the received data packet is associated with a read transaction or a write transaction, reroute the received data packet from the particular destination to the register of the storage system 116. In at least one embodiment, the data packet management component 113 can be configured to use an allocated read tag of a read TLP to communicate data from a completion buffer before the read tag is deallocated. The data packet management component 113 can be configured to communicate a response to a component or element of the computer system 100 that requested the read to inform that component or element that the read was dropped.

In at least one embodiment the storage system 116 can further include interface for external communications from the storage system 116. The interface can include the ports 106 and/or the virtual ports 105. The interface can be a component of the system controller 102; however, embodiments are not so limited. For example, the interface can be external to the system controller 102. Although FIG. 1 illustrates the ports 106 and the virtual ports 105 as components of the system controller 102, embodiments are not so limited. For example, the ports 106 and the virtual ports 105 can be external to the system controller 102. The interface can be used to communicate with the host systems 104 via a physical host interface. The interface can convert commands received from one or more of the host systems 104 into command instructions to access the memory devices 112 as well as convert responses associated with the memory devices 112 into information for one or more of the host systems 104. In some embodiments, the storage system 116 can be a multi-function storage system. However, embodiments of the present disclosure are not limited to multi-function storage systems or multi-port storage systems. Data packet management described herein can be applied to single-function storage systems and single-port storage systems. In some embodiments, each of the ports 106 can be associated with a different function of the storage system 116. In some embodiments, the interface can be a PCIe interface.

In at least one embodiment, the data packet management component 113 can be configured to, responsive to a reset of the interface, determine a type and/or a destination of a data packet. A reset of the interface can include a reset of one of the ports 106. The data packet management component 113 can be configured to, responsive to a reset of the interface, determine whether a packet is of a particular type. The data packet management component 113 can be configured to, responsive to a reset of the interface, determine whether a data packet is to be communicated, via the interface (e.g., via one of the ports 106), to a destination external to the storage system 116, such as one of the host systems 104. The data packet management component 113 can be configured to, responsive to determining that the data packet is of the particular type and is to be communicated to a destination external to the storage system 116, reroute the data packet to a register of the storage system 116.

Data packet management as described herein is not limited to use with a reset. For example, in some embodiments, the data packet management component 113 can be configured to block communication of particular data packets to flush resources of the storage system 116. As used herein, "flushing resources" refers to processing outstanding transactions or commands to which the resources have been allocated. Flushing resources of the storage system 116 can enable those resources to be redeployed. For example, the resources can be reassigned to a different function of the storage system 116 or a different component or element of the computing system 100. As described herein, the data packet management component 113 can reroute data packets generated from processing the outstanding transactions to local memory of the storage system 116 to block communication of the data packets.

In at least one embodiment, the storage system 116 can be configured to perform operations comprising flushing a resource of the storage system 116. The storage system 116 can be a multi-function storage system and the resource can be associated with a function of the storage system 116. The storage system 116 can flush the resource by processing outstanding transactions using the resource, determining whether each data packet generated from processing the outstanding transactions is outgoing via interface, and determining whether each data packet generated from processing the outstanding transactions is of a first type of data packet. In response to determining that a data packet generated from processing one of the outstanding transactions is outgoing and of the first type, the storage system 116 can reroute the data packet from the interface to a first in, first out (FIFO) memory of the storage system 116. The data packet can be dropped from the FIFO memory. The storage system 116 can be further configured to determine whether each data packet generated from processing the outstanding transactions is of a second type. In response to determining that a data packet generated from processing one of the outstanding transactions is outgoing and of the second type, the storage system 116 can be configured to communicate the data packet from the storage system 116 via the interface.

The storage system 116 can also include additional circuitry or components that are not illustrated. In some embodiments, the storage system 116 can include a cache or buffer (e.g., DRAM) and address circuitry (e.g., a row decoder and a column decoder) that can receive an address from the system controller 102 and decode the address to access the memory devices 112.

Figure 2:
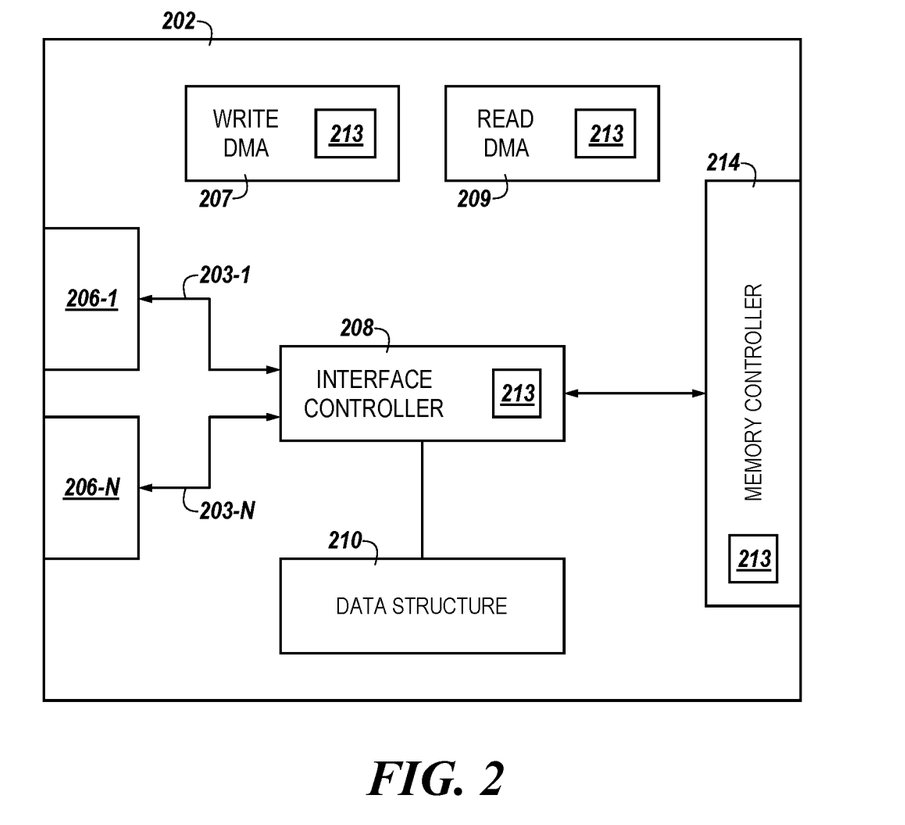
FIG. 2 illustrates an example of a storage system controller in accordance with some embodiments of the present disclosure.

FIG. 2 illustrates an example of a system controller 202 in accordance with some embodiments of the present disclosure. The system controller 202 can be analogous to the system controller 102 illustrated by FIG. 1. The system controller 202 can include a memory controller 214 to control operation of memory devices of a storage system, such as the memory devices 112 of the storage system 116 illustrated by FIG. 1. In some embodiments, the memory controller 214 is a flash memory controller, such as a NAND flash controller, or other suitable controller and media.

The system controller 202 can include an interface controller 208, which is communicatively coupled to one or more of port 206-1, . . . , port 206-N. The port 206-1, . . . , port 206-N can be referred to collectively as the ports 206 and analogous to the ports 106 illustrated by FIG. 1. The interface controller 208 can control movement of commands and/or data between one or more host systems, such as the host systems 104 illustrated by FIG. 1, and the memory controller 214. For instance, the interface controller 208 can process commands transferred between the host systems and the memory devices of the storage system via the memory controller 214. In some embodiments, the interface controller 208 is a NVMe controller. For example, the interface controller 208 can operate in accordance with a logical device interface specification (e.g., protocol), such as the NVMe specification or a non-volatile memory host controller interface specification. Accordingly, in some embodiments, the interface controller 208 can process commands according to the NVMe protocol. In at least one embodiment, bit bucketing can include flushing host and/or VM context (e.g., proprietary information, hash signatures, cryptokeys, etc.) securely from the interface controller 208 before resources storing the host and/or VM context is redeployed and/or reused by another host and/or VM. Flushing host and/or VM context from the interface controller 208 can reduce the risk of secret-leaks.

The interface controller 208 can be coupled to the ports 206 via respective command paths (e.g., command path 203-1, . . . , command path 203-N). The command path 203-1, . . . , the command path 203-N can be referred to collectively as the command paths 203. The command paths 203 can include physical paths (e.g., a wire or wires) that can be configured to pass physical functions and/or VFs between a respective one of the ports 206 and the interface controller 208. The command paths 203 can be configured to pass physical functions and/or VFs between a respective one of the ports 206 and the interface controller 208 in accordance with the NVMe standard. For example, in an SR-IOV deployment, the interface controller 208 can serve as multiple controllers (e.g., multiple NVMe controllers) for respective physical functions and/or each VF, such that the interface controller 208 provides multiple controller operations.

The interface controller 208 can be coupled to a data structure 210. As used herein, a "data structure" refers to a specialized format for organizing and/or storing data, which may or may not be organized in rows and columns. Examples of data structures include arrays, files, records, tables, trees, etc.

Although FIG. 2 illustrates a single interface controller 208, embodiments are not so limited. For instance, the interface controller 208 can comprise multiple sub-controllers and/or multiple controllers. For example, each respective one of the ports 206 can have a separate interface controller coupled thereto.

The system controller 202 can include direct memory access (DMA) components that can allow for the system controller 202 to access main memory of a computing system (e.g., DRAM, SRAM, etc. of the host systems 104 of the computing system 100 illustrated by FIG. 1). Write DMA 207 and read DMA 209 can facilitate transfer of information between the host systems and the memory devices of the storage system. In at least one embodiment, the write DMA 207 facilitates reading of data from a host system and writing of data to a memory device of the storage system. In at least one embodiment, the read DMA 209 can facilitate reading of data from a memory device of a storage system and writing of data to a host system. In some embodiments, the write DMA 207 and/or read DMA 209 reads and writes data via a PCIe connection.

The system controller 202 can include a data packet management component 213. The data packet management component 213 can be analogous to the data packet management component 113 illustrated by FIG. 1. The functionality of the data packet management component 213 can be implemented by the system controller 202 and/or one or more components (e.g., the interface controller 208, the memory controller 214, the write DMA 207, and/or the read DMA 209) within the system controller 202.

The data packet management component 213 can be configured to determine a type and/or a destination of a data packet. The data packet management component 213 can be configured to, responsive to determining that the data packet is of a particular type and is to be communicated from a storage system, reroute the data packet to the registers of the storage system.

Figure 3:
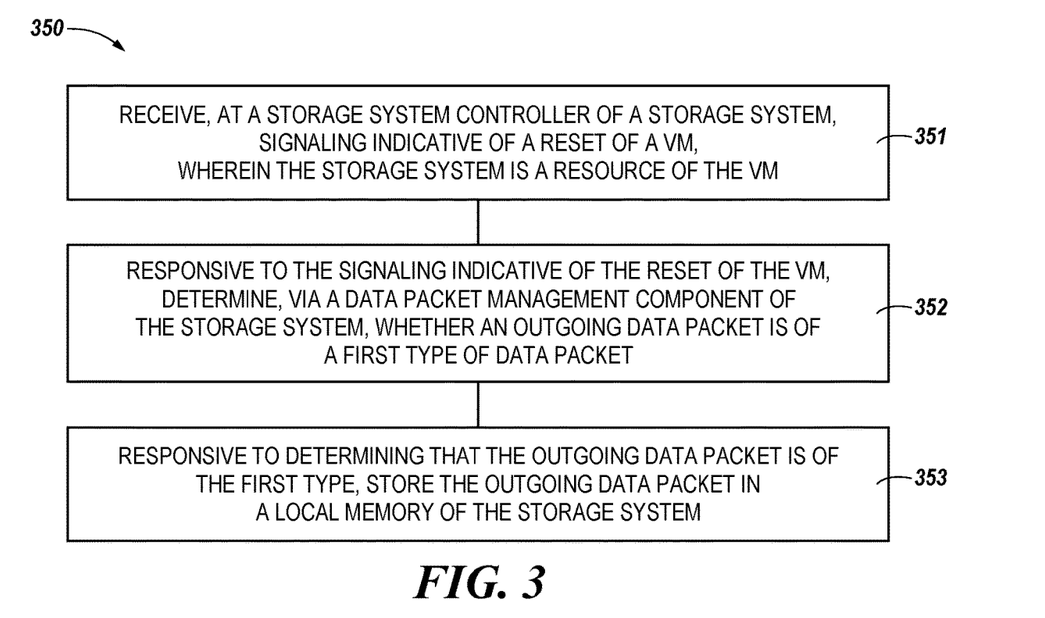
FIG. 3 is a flow diagram corresponding to a method for performing data packet management in accordance with some embodiments of the present disclosure.
Figure 4:
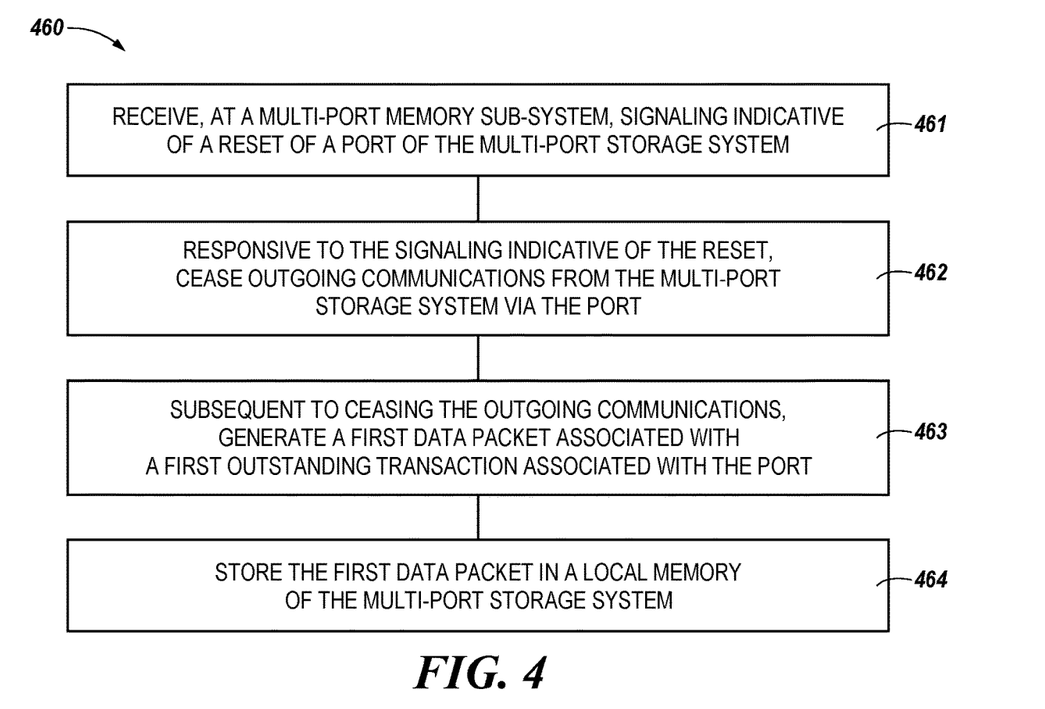
FIG. 4 is a flow diagram corresponding to another method for performing data packet management in accordance with some embodiments of the present disclosure.

FIGS. 3-4 each illustrate a flow diagram corresponding to a method 350, 460 for performing data packet management in accordance with some embodiments of the present disclosure. Each respective method 350, 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, each method 350, 460 is performed using the data packet management component 113 of FIG. 1, and/or the data packet management component 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3 illustrates a flow diagram corresponding to a method 350 for performing storage system operations to manage communication of data packets in accordance with some embodiments of the present disclosure. At operation 351, the method can include receiving signaling indicative of a reset of a VM at a storage system controller (such as the storage system controller 102) of a storage system (such as the storage system controller 102 of the storage system 116 illustrated by FIG. 1). The storage system can be a resource of the VM.

At operation 352, the method 350 can include determining, via a data packet management component (such as the data packet management component 113) of the storage system, whether an outgoing data packet is of a first type in response to the signaling indicative of the reset of the VM.

At operation 353, the method 350 can include storing the outgoing data packet in a local memory of the storage system in response to determining that the outgoing data packet is of the first type. The first type of data packet can be a write TLP or a read TLP, for example.

In some embodiments, the method 350 can include preventing communication of the outgoing data packet to a host system coupled to the storage system (such as the host system 104-1) by storing the outgoing data packet in the local memory. Subsequently, the storage system can determine an action to take with the data packet asynchronously. The method 350 can include, subsequent to receiving the signaling indicative of the reset, processing an outstanding transaction via the storage system controller and generating the outgoing data packet as a result of processing the outstanding transaction.

In some embodiments, the method 350 can include responsive to the signaling indicative of the reset, determining, via the data packet management component, whether the outgoing data packet is of a second type of data packet. The second type of data packet can be a message TLP or a completion TLP, for example. The method 350 can further include, responsive to determining that the outgoing data packet is of the second type, communicating the outgoing data packet to a host system coupled to the storage system (such as the host system 104-1).

FIG. 4 is a flow diagram corresponding to a method 460 for performing storage system operations to manage communication of data packets in accordance with some embodiments of the present disclosure. At operation 461, the method 460 can include receiving, at a multi-port storage system (such as the storage system 116), signaling indicative of a reset of a port of the multi-port memory sub-system. At operation 462, the method 460 can include, responsive to the signaling indicative of the reset, ceasing outgoing communications from the multi-port storage system via the port. At operation 463, the method 460 can include subsequent to ceasing the outgoing communications, generating a first data packet associated with a first outstanding transaction associated with the port. At operation 464, the method 460 can include storing the first data packet in a local memory of the multi-port storage system.

In some embodiments, the method 460 can include, subsequent to storing the first data packet, generating a second data packet associated with a second outstanding transaction associated with the port and storing the second data packet in the local memory. The method 460 can include dropping the first data packet from the local memory.

Figure 5:
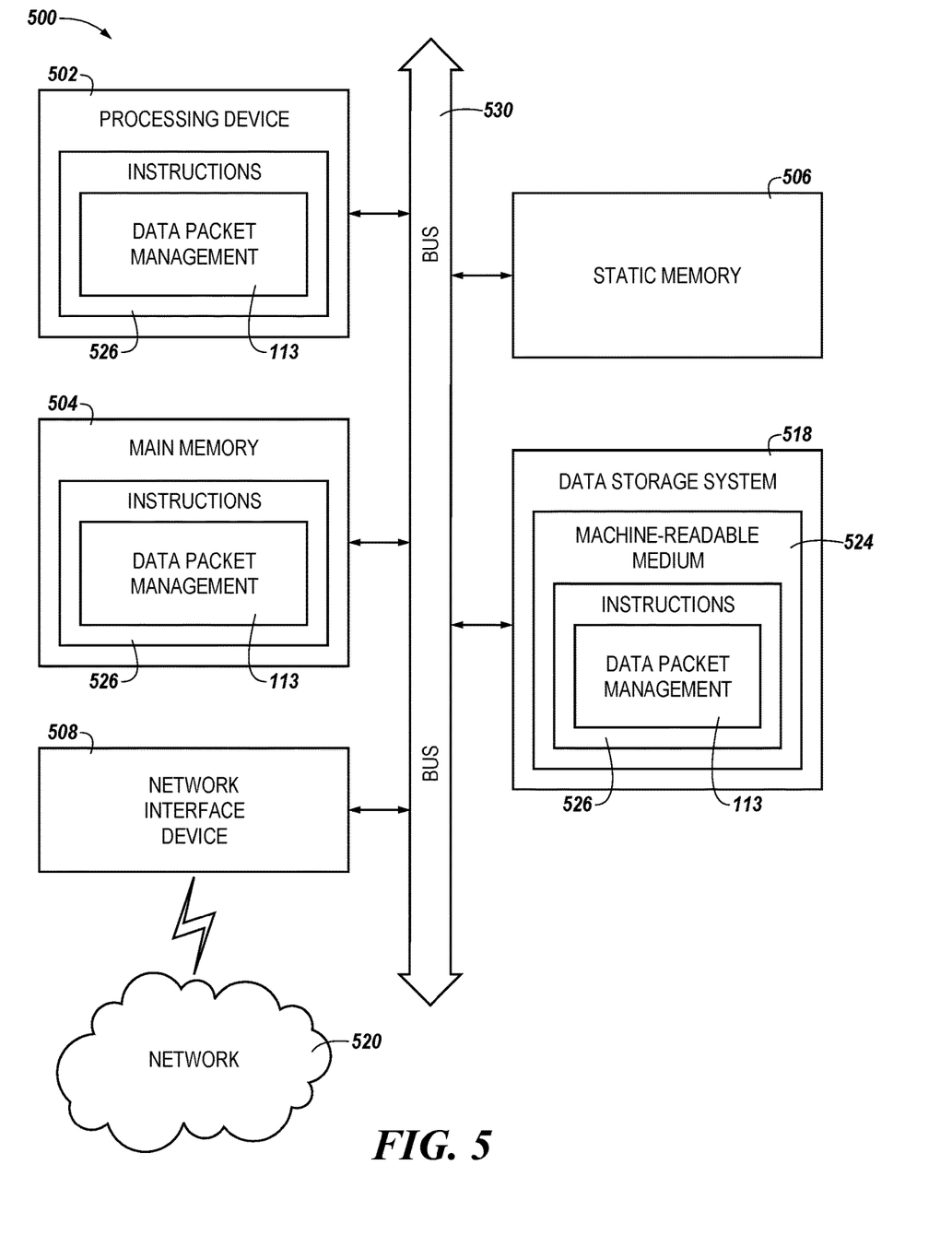
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 104-1 of FIG. 1) that includes, is coupled to, or utilizes a storage system (e.g., the storage system 116 of FIG. 1) or can be used to perform the operations of a controller (e.g., to execute an operating system to perform operations corresponding to the data packet management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the storage system 116 of FIG. 1.

In one embodiment, the instructions 526 include instructions to implement functionality corresponding data packet management (e.g., the data packet management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art.

An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
   a storage system comprising a first in, first out (FIFO) memory configured to store data packets; and
   circuitry coupled to the storage system and configured to perform operations comprising:
      determining a type of a received data packet;
      determining a destination of the received data packet;
      determining whether the received data packet is of a particular type or has a particular destination; and
      responsive to determining that the received data packet is of the particular type or has the particular destination;
         rerouting the received data packet from being communicated from the storage system to the particular destination to the FIFO memory such that processing of a transaction of the storage system from which the received data packet is generated is completed without communicating the received data packet to the particular destination; and
         storing the received data packet in the FIFO memory.

2. The system of claim 1, wherein the storage system is a resource of a virtual machine.

3. The system of claim 1, wherein the circuitry is to determine whether the destination of the received data packet is a host system coupled to the storage system.

4. The system of claim 1, wherein the circuitry is to perform operations comprising:
   determining whether the received data packet is associated with a read transaction of the storage system; and
   responsive to determining that the received data packet is associated with the read transaction:
      rerouting the received data packet from being communicated from the storage system to the particular destination to the FIFO memory such that processing of the read transaction from which the received data packet is generated is completed without communicating the received data packet to the particular destination;
      storing the received data packet in the FIFO memory.

5. The system of claim 1, wherein the circuitry is to perform operations comprising:
   determining whether the received data packet is associated with a write transaction of the storage system; and
   responsive to determining that the received data packet is associated with the write transaction:
      rerouting the received data packet from being communicated from the storage system to the particular destination to the FIFO memory such that processing of the write transaction from which the received data packet is generated is completed without communicating the received data packet to the particular destination; and
      storing the received data packet in the FIFO memory.

6. The system of claim 1, wherein, responsive to a reset of a virtual machine to which the storage system is assigned, the circuitry is to perform operations comprising:
   determining whether the received data packet is of the particular type;
   determining whether the received data packet is to be communicated to a destination external to the storage system; and
   responsive to determining that the received data packet is of the particular type and is to be communicated to a destination external to the storage system:
      rerouting the received data packet from being communicated from the storage system to the destination external to the storage system to the FIFO memory such that processing of a transaction from which the received data packet is generated is completed without communicating the received data packet to the destination external to the storage system; and
      storing the received data packet in the FIFO memory.

7. A method, comprising:
   receiving, at a storage system controller of a storage system, signaling indicative of a reset of a virtual machine (VM), wherein the storage system is a resource of the VM;
   responsive to the signaling indicative of the reset of the VM, determining, via a data packet management component of the storage system, whether an outgoing data packet is of a first type of data packet; and
   responsive to determining that the outgoing data packet is of the first type, storing the outgoing data packet in a first in, first out (FIFO) memory of the storage system such that processing of an outgoing transaction of the storage system from which the outgoing data packet is generated is completed without communicating the outgoing data packet from the storage system.

8. The method of claim 7, further comprising subsequent to receiving the signaling, processing, via the storage system controller, the outstanding transaction.

9. The method of claim 7, further comprising:
   responsive to the signaling, determining, via the data packet management component, whether a different outgoing data packet is of a second type of data packet; and
   responsive to determining that the different outgoing data packet is of the second type, communicating the different outgoing data packet from the storage system to a host system coupled to the storage system.

10. A method, comprising:
    receiving, at a multi-port storage system, signaling indicative of instructions to reset a particular port of the multi-port storage system; and
    responsive to resetting the particular port and while the particular port is being reset:
       ceasing outgoing communications from the multi-port storage system via the particular port;
       generating, by the multi-port storage system, a first data packet associated with a first outstanding transaction associated with the particular port;
       storing the first data packet in a first in, first out (FIFO) memory of the multi-port storage system such that processing of the first outstanding transaction is completed without communicating the first data packet from the multi-port storage system.

11. The method of claim 10, further comprising, responsive to resetting the particular port and while the particular port is being reset:
  subsequent to storing the first data packet in the FIFO memory, generating the second data packet, wherein the second data packet is associated with a second outstanding transaction associated with the particular port; and
  storing the second data packet in the FIFO memory such that processing of the second outstanding transaction is completed without communicating the second data packet from the multi-port storage system.

12. A system, comprising:
  a multi-function storage system comprising a first in, first out (FIFO) memory configured to store data packets; and
  interface coupled to the multi-function storage system,
  wherein the multi-function storage system is configured to perform operations comprising flushing a resource of the multi-function storage system by:
    processing outstanding transactions using the resource;
    determining whether each data packet generated from processing the outstanding transactions is outgoing via the interface;
    determining whether each data packet generated from processing the outstanding transactions is of a first type of data packet; and
    responsive to determining that a data packet generated from processing one of the outstanding transactions is outgoing and of the first type:
      rerouting the data packet from being communicated from the multi-function storage system via the interface to the FIFO memory of the multi-function storage system such that processing of the corresponding one of the outstanding transactions is completed without communicating the data packet from the multi-function storage system; and
      storing the data packet in the FIFO memory.

13. The system of claim 12, wherein the resource is associated with a function of the multi-function storage system.

14. The system of claim 12, wherein the interface is a peripheral component interconnect express (PCIe) interface.

15. The system of claim 12, wherein the multi-function storage system is to perform operations comprising:
  determining whether each data packet generated from processing the outstanding transactions is of a second type of data packet; and
  responsive to determining that the data packet generated from processing one of the outstanding transactions is outgoing and of the second type, communicating the data packet from the multi-function storage system via the interface.

16. The system of claim 12, wherein the multi-function storage system is coupled to a host system via the interface; and
  wherein the multi-function storage system is to flush context associated with the host system from a processing device of the multi-function storage system.

* * * * *